(12) United States Patent
Sullivan

(10) Patent No.: US 10,281,657 B2
(45) Date of Patent: May 7, 2019

(54) OPTICAL ROTARY ELECTRICAL CONNECTION

(71) Applicant: Moog Inc., East Aurora, NY (US)

(72) Inventor: Robert R. Sullivan, Kirkwood, PA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 15/566,542

(22) PCT Filed: Apr. 14, 2016

(86) PCT No.: PCT/US2016/027545
§ 371 (c)(1),
(2) Date: Oct. 13, 2017

(87) PCT Pub. No.: WO2016/168470
PCT Pub. Date: Oct. 20, 2016

(65) Prior Publication Data
US 2018/0120510 A1 May 3, 2018

Related U.S. Application Data

(60) Provisional application No. 62/148,084, filed on Apr. 15, 2015.

(51) Int. Cl.
*G02B 6/36* (2006.01)
*G02B 6/32* (2006.01)
(Continued)

(52) U.S. Cl.
CPC ............. *G02B 6/3604* (2013.01); *G02B 6/32* (2013.01); *G02B 6/4284* (2013.01);
(Continued)

(58) Field of Classification Search
CPC ....... G02B 6/3604; G02B 6/32; G02B 6/4284
See application file for complete search history.

(56) References Cited

U.S. PATENT DOCUMENTS 4,109,998 A    8/1978  Iverson
4,124,272 A *  11/1978 Henderson ........... G02B 6/3604
                                                      385/26
(Continued)

FOREIGN PATENT DOCUMENTS

EP    1 227 554 A1    7/2002
JP    2001305381 A  * 10/2001
(Continued)

OTHER PUBLICATIONS

International Search Report and Written Opinion of the International Searching Authority (12 pages) completed Jun. 16, 2016.
(Continued)

*Primary Examiner* — Daniel Petkovsek
(74) *Attorney, Agent, or Firm* — Harter Secrest & Emery LLP

(57) ABSTRACT

An electrical rotary connection (15) comprising a first element (18) supported by a housing (16), a second element (19) supported by the housing, the first and second elements configured to rotate about a central axis (X) relative to each other at a rotary interface (20), the first element (18) comprising an input electrical lead (21), an electrical-to-optical E/O converter (22) having an optical source (23), and a transmitting lens (28), the second element (19) comprising a receiving lens (30) opposing the first element across the rotary interface, an optical-to-electrical O/E converter (32) having an optical receiver (33), and an output electrical lead (35), whereby electrical input received by the first element may be converted into light, the light may be transmitted on-axis across the rotary interface to the second element, and the light may be converted into an electrical output by the second element for transmission via the output electrical lead of the second element.

26 Claims, 5 Drawing Sheets

(51) Int. Cl.
  *G02B 6/42* (2006.01)
  *H04B 10/112* (2013.01)
  *H04B 10/40* (2013.01)
  *G02B 6/38* (2006.01)
(52) U.S. Cl.
  CPC ....... *G02B 6/4292* (2013.01); *H04B 10/1125* (2013.01); *H04B 10/40* (2013.01); *G02B 6/3897* (2013.01); *G02B 6/4246* (2013.01)

(56) References Cited

U.S. PATENT DOCUMENTS

| | | | | |
|---|---|---|---|---|
| 4,447,114 | A * | 5/1984 | Koene | G02B 6/3604 |
| | | | | 385/26 |
| 4,641,915 | A * | 2/1987 | Asakawa | G02B 6/3886 |
| | | | | 385/26 |
| 4,889,406 | A * | 12/1989 | Sezerman | G02B 6/32 |
| | | | | 385/35 |
| 5,039,193 | A * | 8/1991 | Snow | G02B 6/262 |
| | | | | 385/25 |
| 5,301,249 | A | 4/1994 | Hamblen et al. | |
| 5,436,988 | A | 7/1995 | Narendran | |
| 5,553,176 | A * | 9/1996 | DeMarco, Jr. | G02B 6/3604 |
| | | | | 385/25 |
| 6,301,405 | B1 | 10/2001 | Keil | |
| 6,561,813 | B2 * | 5/2003 | Rutten | H01R 39/08 |
| | | | | 439/26 |
| 6,925,256 | B1 | 8/2005 | Heiney | |
| 7,093,985 | B2 | 8/2006 | Lord et al. | |
| 7,142,747 | B2 | 11/2006 | Oosterhuis et al. | |
| 7,239,776 | B2 | 7/2007 | Oosterhuis et al. | |
| 7,690,849 | B2 | 4/2010 | Scharf et al. | |
| 8,355,607 | B2 * | 1/2013 | Zhang | G02B 6/3604 |
| | | | | 385/26 |
| 8,909,008 | B1 * | 12/2014 | Tzeng | G02B 6/3604 |
| | | | | 385/25 |
| 9,784,953 | B2 * | 10/2017 | Rosenberg | G02B 13/22 |
| 2018/0120510 | A1 * | 5/2018 | Sullivan | G02B 6/32 |

FOREIGN PATENT DOCUMENTS

| | | |
|---|---|---|
| JP | 2008 227731 A | 9/2008 |
| KR | 2010 0022216 A | 3/2010 |
| WO | 2005031416 A1 | 4/2005 |

OTHER PUBLICATIONS

Lohr, Jöstingmeier & Partner, Observations by Third Parties, Submission Under Rule 115 EPC in European Patent Application 16718948.9, dated Aug. 9, 2018, Europe.

* cited by examiner

US 10,281,657 B2

OPTICAL ROTARY ELECTRICAL CONNECTION

TECHNICAL FIELD

The present invention relates generally to the field of connectors, and more particularly to an optical rotary electrical connector.

BACKGROUND ART

In certain applications, fiber optical rotary joints are employed to interconnect optical fibers of two different bundles, while permitting at least one of the bundles to rotate relative to the other. For example, U.S. Pat. No. 7,142,747 is directed to a fiber optical rotary joint (FORJ) having a housing that defines an internal cavity. The housing is adapted to engage end portions of two bundles of optical fibers with the two bundles disposed on opposite sides of the internal cavity. By appropriately aligning the first and second bundles of optical fibers, respective pairs of the optical fibers of the first and second bundles can communicate across the internal cavity. The first and second bundles of optical fibers generally terminate with an optical collimation array. A collimating lens, such as a ball lens, may be associated with each optical fiber such that the signals emitted by their respective optical fiber are collimated by the ball lens before being launched through the internal cavity. At least one, if not both, of the optical collimation arrays is adapted to rotate about a longitudinal axis relative to the housing. The entire content of U.S. Pat. No. 7,142,747, issued Nov. 28, 2006, is incorporated herein by reference in its entirety.

U.S. Pat. No. 6,301,405 is directed to a multichannel fiber optical rotary joint having an adjustment mechanism which is provided for optimizing the signal strength transmitted through the rotary joint from one set of fiber strands in a bundle to another set of fiber strands in a separate bundle disposed axially from the first bundle.

In certain applications, fiber optic cabling is used to provide high-speed data communications for onboard electronic systems. In such applications, a fiber optic connector may be used to connect the fiber optic cabling to the electronic system. For example, U.S. Pat. No. 7,690,849 is directed to a fiber optic connector insert having an opto-electronic (O/E) converter that converts electric signals to optical signals and optical signals to electrical signals. Such O/E converters may include a transmitter optical subassembly for converting electric signals to optical signals and a receiver optical subassembly for converting optical signals to electrical signals. The entire content of U.S. Pat. No. 7,690,849, issued Apr. 6, 2010, is incorporated herein by reference in its entirety.

U.S. Pat. No. 6,925,256 is directed to a bi-directional optical transmission and reception assembly. The assembly includes an optical transmitter and an optical discriminator having a photo detector and an interference filter. The entire content of U.S. Pat. No. 6,925,256, issued Aug. 2, 2005, is incorporated herein by reference in its entirety.

BRIEF SUMMARY OF THE INVENTION

With parenthetical reference to corresponding parts, portions or surfaces of the disclosed embodiment, merely for the purposes of illustration and not by way of limitation, an electrical rotary connection (15) is provided comprising a housing (16); a first element (18) supported by the housing; a second element (19) supported by the housing; the first element and the second element configured and arranged such that one of the first or second elements rotates about a central axis (x-x) relative to the other of the first or second elements; a rotary interface (20) between the first element and the second element; the first element comprising an input electrical lead (21), an electrical-to-optical E/O converter (22) coupled to the input electrical lead and having an optical source (23), and a transmitting lens (28) coupled to the optical source and configured to direct an optical signal across the rotary interface; the second element comprising a receiving lens (30) opposing the first element across the rotary interface and configured to receive the optical signal from the transmitting lens, an optical-to-electrical O/E converter (32) coupled to the receiving lens and having an optical receiver (33), and an output electrical lead (35) coupled to the O/E converter; whereby an electrical input received by the first element may be converted into light, the light may be transmitted across the rotary interface to the second element, and the light may be converted into an electrical output by the second element for transmission via the output electrical lead of the second element.

The first element may be stationary and the second element may be rotationally supported by the housing so as to operatively rotate relative to the first element. The first element may rotate about the central axis and the second element may rotate about the central axis at a speed different from the first element. The second element may be stationary and the first element may be rotationally supported by the housing so as to operatively rotate relative to the second element. The rotary interface may comprise a gap between the transmitting lens and the receiving lens. The transmitting lens may comprise a beam expanding lens. The first element may further comprise a transmitting optical fiber (26) coupled between the optical source and the transmitting lens. The first element may further comprise a focusing lens (25) coupled between the optical source and the transmitting optical fiber. The second element may further comprise a receiving optical fiber (31) coupled between the receiving lens and the optical receiver. The transmitting lens may comprise a collimating lens and the receiving lens may comprise a collimating lens. The input electrical lead may comprise multiple electrically conductive pins and the output electrical lead may comprise multiple electrically conductive pins. The optical source and the optical receiver may be orientated about the central axis. The first element may further comprise transmitting optical fiber coupled between the optical source and the transmitting lens, the second element may further comprise receiving optical fiber coupled between the receiving lens and the optical receiver, and the transmitting optical fiber and the receiving optical fiber may be each orientated about the central axis.

The E/O converter may comprise a transceiver (122) having an optical receiver (124) and the O/E converter may comprise a transceiver (132) having an optical source (134), whereby an electrical input received by the output electrical lead (35) of the second element (119) may be converted into light, the light may be transmitted across the rotary interface (20) to the first element (118), and the light may be converted into an electrical output by the first element for transmission via the input electrical lead (21) of the first element. The transmission from the first element across the rotary interface to the second element may have a first wavelength and the transmission from the second element across the rotary interface to the first element may have a second wavelength different from the first wavelength. The first element and the second element may each further comprise a dichroic filter (140, 141). The transmission from the first element to the second element and the transmission from the second element to the first element may be on-axis and simultaneous. The first element may be configured and arranged to transmit multiple optical signals at multiple different wavelengths and the second element may be configured to receive the multiple transmitted optical signals from the first element. The first element may comprise multiple optical sources configured to transmit the optical signals at the different wavelengths and the second element may comprise multiple optical receivers configured to receive the optical signals at the different wavelengths, respectively.

In another aspect, an electrical rotary connection (215) is provided comprising: a housing; a first element (218) supported by the housing; a second element (219) supported by the housing; the first element and the second element configured and arranged such that one of the first or second elements rotates about a central axis relative to the other of the first or second elements; a rotary interface between the first element and the second element; the first element comprising an input optical fiber (221) and a transmitting lens (228) coupled to the input optical fiber and configured to direct an optical signal across the rotary interface; the second element comprising an receiving lens opposing the first element across the rotary interface and configured to receive the optical signal from the transmitting lens, an optical-to-electrical O/E converter coupled to the receiving lens and having an optical receiver, and an electrical lead (31) coupled to the E/O converter; whereby an optical input received by the input optical fiber of the first element may be transmitted across the rotary interface to the second element, and the light may be converted into an electrical output by the second element for transmission via the electrical lead of the second element.

The second element may further comprise a receiving optical fiber coupled between the receiving lens and the optical receiver and the receiving lens may comprise a collimating lens. The electrical lead may comprise multiple electrically conductive pins. The O/E converter may comprise a transceiver having an optical source, whereby an electrical input received by the electrical lead of the second element may be converted into light, the light may be transmitted across the rotary interface to the first element, and the light may be transmitted by the first element via the input optical fiber.

In another aspect, an electric rotary connection (315) is provided comprising: a housing; a first element (318) supported by the housing; a second element (319) supported by the housing; the first element and the second element configured and arranged such that one of the first or second elements rotates about a central axis relative to the other of the first or second elements; a rotary interface between the first element and the second element; the first element comprising an electrical lead, an electrical-to-optical E/O converter coupled to the electrical lead and having an optical source, and a transmitting lens coupled to the optical source and configured to direct an optical signal across the rotary interface; the second element comprising a receiving lens opposing the first element across the rotary interface and configured to receive the optical signal from the transmitting lens, and a receiving optical fiber (335) coupled to the receiving lens; whereby an electrical input received by the first element may be converted into light, the light may be transmitted across the rotary interface to the second element, and the light may be transmitted by the second element via the receiving optical fiber.

The first element may further comprise transmitting optical fiber coupled between the optical source and the transmitting lens and a focusing lens coupled between the optical source and the transmitting optical fiber. The receiving lens may comprise a collimating lens. The electrical lead may comprise multiple electrically conductive pins. The E/O converter may comprise a transceiver having an optical receiver, whereby an optical input received by the optical fiber and the receiving lens of the second element may be transmitted across the rotary interface to the first element, and the light may be converted into an electrical output by the first element for transmission via the electrical lead of the first element. The first element and the second element may each further comprise a dichroic filter.

DETAILED DESCRIPTION OF THE PREFERRED EMBODIMENTS

Figure 1:
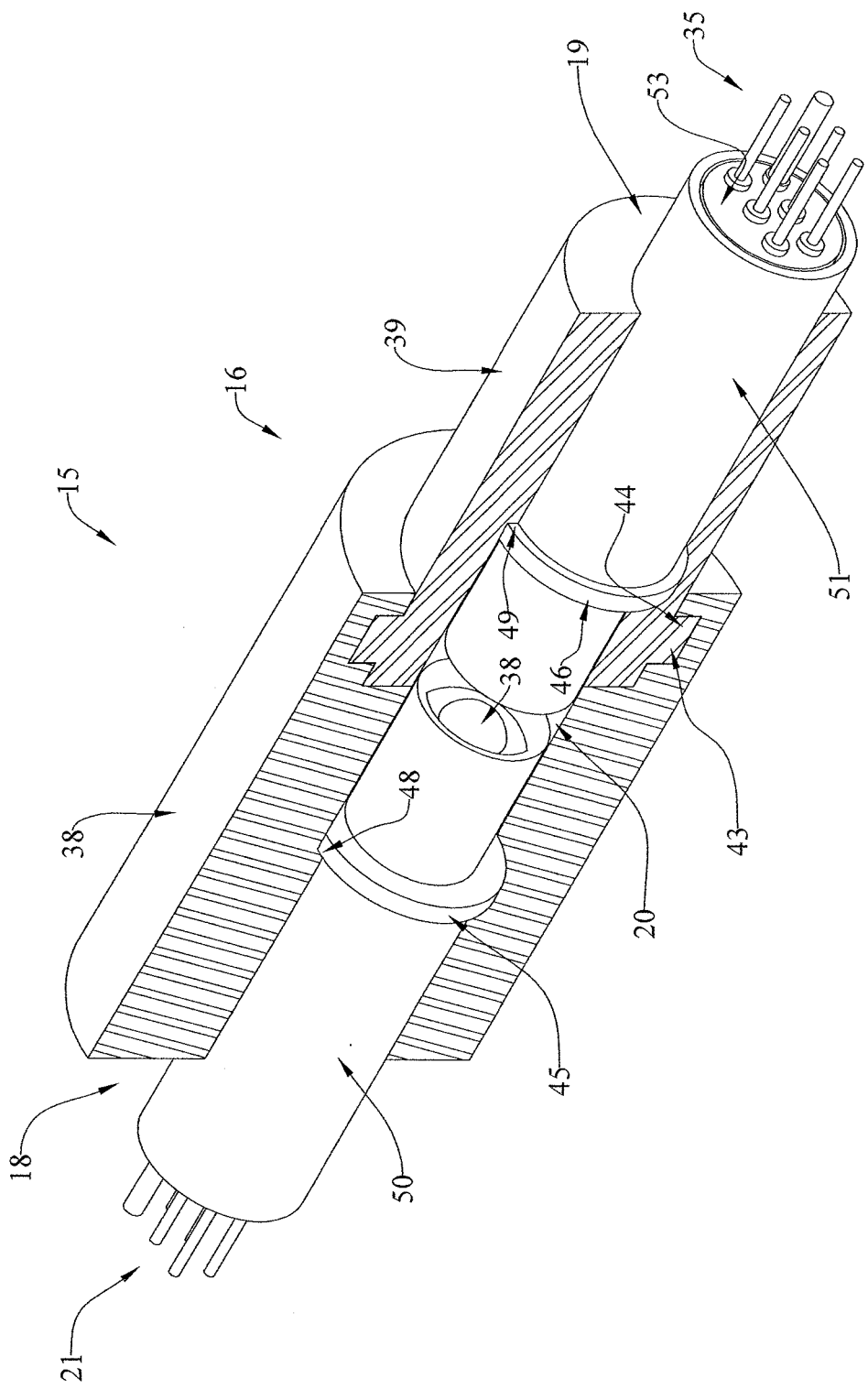
FIG. 1 is a partial cross-sectional and partial isometric view of a first embodiment of an improved electrical rotary connection.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, an improved electrical rotary connection is provided, of which a first embodiment is generally indicated at 15. Connection 15 is shown as broadly including housing 16, which generally supports stationary connection element 18 and rotating connection element 19. Elements 18 and 19 are generally positioned on opposite sides of rotary interface or joint 20 and are configured to transmit optical signals on-axis across rotary joint 20.

As shown, housing 16 includes first housing portion or subassembly 38 and second housing portion or subassembly 39. Housing portion 38 supports connection element 18 and housing portion 39 rotationally supports connection element 19 relative to housing portion 38. Housing 16 is configured to provide a rotary joint between connection elements 18 and 19 that permits at least one of connection elements 18 or 19 to rotate relative to the other. While in this embodiment element 18 is generally held stationary and element 19 is generally permitted to rotate about its longitudinal axis x-x, alternatively both elements 18 and 19 could be configured to rotate about axis x-x at different speeds and/or in different directions. As another alternative, connection element 19 may be configured to be held stationary while element 18 is generally permitted to rotate about its longitudinal axis x-x. Thus, one or both of connection elements 18 and 19 are rotatably mounted such that one element may rotate about its respective longitudinal axis relative to the other element.

As shown, housing 16 is a generally cylindrical member having an elongated inner cylindrical cavity 42, with housing portion 38 overlapping housing portion 39. To facilitate rotation of connection element 19 relative to connection element 18, housing portion 39 includes medial annular flange 43 that extends radially outward from axis x-x. Housing portion 38 in turn includes annular groove 44 configured to receive annular flange 43 of housing portion 39 in rotational sliding engagement. Portion 39 may thereby rotate about axis x-x relative to portion 38, but does not move significantly axially along axis x-x relative to portion 38. Thus, medial flange 43 engages groove 44 in order to facilitate rotation of housing portion 39 relative to housing portion 38, and thereby allows for the rotation of connection element 19 relative to connection element 18 at rotary interface 20. In this embodiment, a bushing or other bearing arrangement is not needed. However, a bushing or rolling-element bearings may be employed if desired.

In order to retain connection element 18 in cylindrical passage 42 formed by housing portion 38, annular flange or ring 45 extends radially outward from sleeve 50 of connection element 18 and bears against specially configured annular shoulder 48 of housing portion 38 to retain connection element 18 axially in passage 42. Similarly, annular flange or ring 46 extends radially outward from sleeve 51 of connection element 19 and bears against specially configured annular shoulder 49 of housing portion 39 to retain connection element 19 axially in passage 42. Elements 18 and 19 are positioned in passage 42 such that a gap between their opposed right and left ends, respectively, is provided at rotary interface 20. However, elements 18 and 19 may be retained and rotatably mounted relative to each other in other manners, if so desired.

Figure 2:
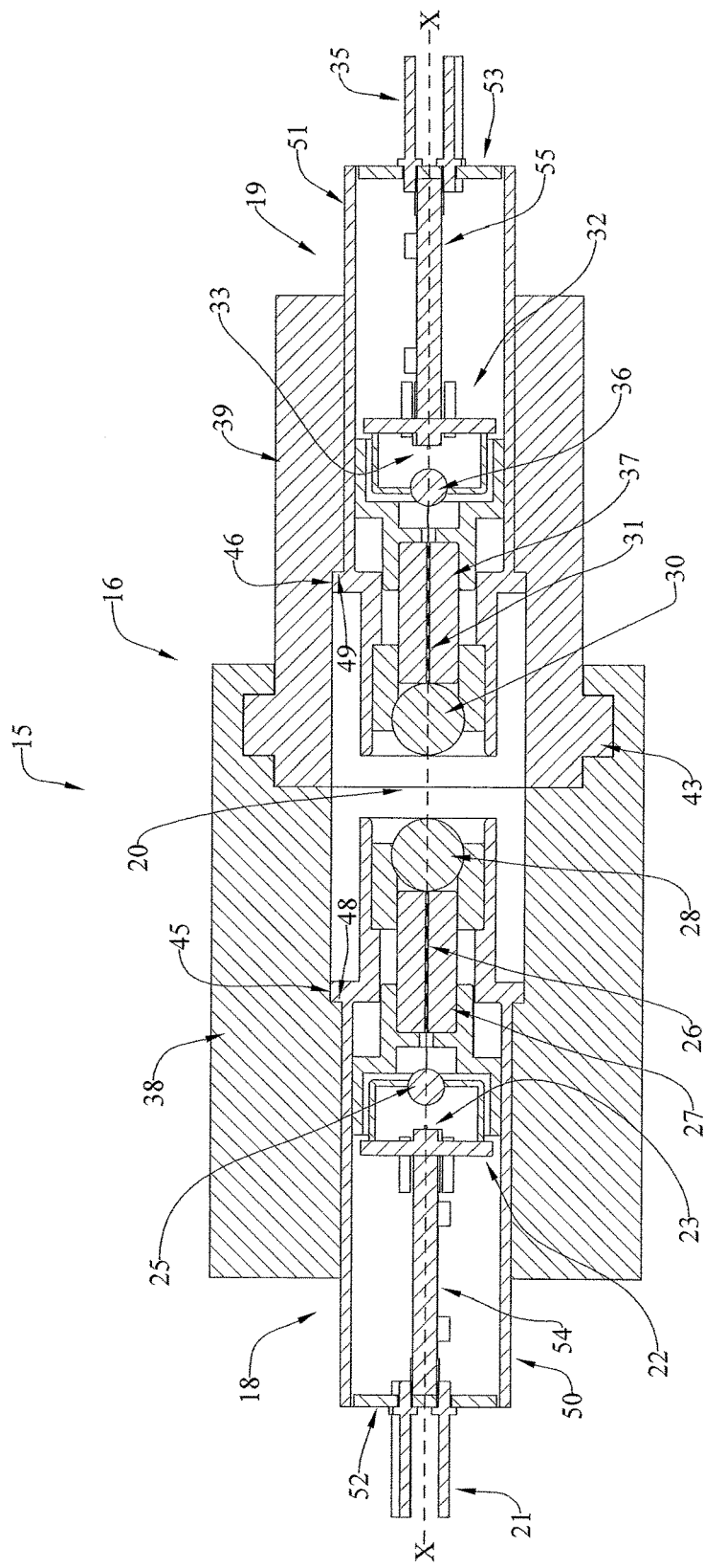
FIG. 2 is a longitudinal vertical sectional view of the electrical rotary connection shown in FIG. 1.

As shown in FIG. 2, optical connection element 18 generally includes electrical lead 21, printed circuit board 54, E/O converter 22, focusing lens 25, optical fiber ferrule stub 27, and expanding collimating lens 28, all of which are retained in generally cylindrical sleeve 50. In this embodiment, electric lead 21 comprises a plurality of electrically conductive pins carried by and extending through end portion 52 of sleeve 50. The electrically conductive pins extend through end portion 52 to define a plurality of external electrical connection pins. This allows connection element 18 to be easily connected to electrical circuitry. Electrically conductive pins 21 are coupled internally to circuit board 54 adjacent the left end thereof. In this embodiment, six electrically conductive pins are provided, with three pins on top of circuit board 54 and three pins below circuit board 54. However, lead 21 may include as few as one or more than the six pins shown.

As shown, housing sleeve 50 has a cylindrical shape elongated along longitudinal axis x-x and circuit board 54 is illustratively mounted to extend along longitudinal axis x-x within sleeve 50. A second plurality of electrically conductive pins extend from E/O converter 22, which are further coupled to circuit board 54 adjacent the right end thereof. Thus, circuit board 54 is both mechanically and electrically coupled to a first plurality of electrically conductive pins 21 at its left end and circuit board 54 is both mechanically and electrically coupled to E/O converter 22 by a second plurality of electrically conductive pins at its right end.

E/O converter 22 comprises optical source 23 and circuitry carried by circuit board 54 and coupled to optical source 23. As will be appreciated by those skilled in the art, optical source 23 may comprise a laser, a light emitting diode, or any other suitable optical source. As shown, E/O converter 21 has a shape compatible with TO-can optical packaging. In this embodiment, E/O converter 21 comprises a transmit optical subassembly (TOSA).

An optical fiber termination assembly is coupled to E/O converter 22. The optical fiber termination assembly comprises focusing lens 25, optical fiber ferrule stub 27, and optical fiber 26. Focusing lens 25 is coupled between E/O converter 22 and fiber 26 and accurately focuses and directs the optical signal or light from optical source 23 to optical fiber 26 carried by optical fiber ferrule stub 27. As may be appreciated by those skilled in the art, lens 25 may comprise any form of focusing lens. Moreover, any device capable of directing the optical signal from optical source 23 to optical fiber 26 carried by optical ferrule stub 27 may be used.

As shown, lens 28 is optically coupled to optical source 23 by optical fiber 26. Lens 28 expands the optical signal from optical fiber 26 carried by optical fiber ferrule stub 27 and directs it on-axis x-x across the gap of rotary junction 20 to receiving lens 30 of connection element 19. In this embodiment, lens 28 is an expanded beam collimating lens, such as a ball lens. However, other beam expanding lenses may be used. As shown, lens 28 is held in a frame within sleeve 50 and is centered on the beam of light from optical source 23 through fiber 26. In this embodiment, fiber 26, fiber stub 27 and lens 28 are orientated on axis x-x.

The left end of optical connection element 19 faces the right end of optical connection element 18 across the gap at rotary interface 20. As shown in FIG. 2, optical connection element 19 generally includes collimating lens 30, optical fiber ferrule stub 37, focusing lens 25, O/E converter 32, printed circuit board 55, and electrical lead 35, all of which are retained in generally cylindrical sleeve 51.

As shown, lens 30 is positioned on axis x-x to receive the optical signal directed across the gap of rotary junction 20 from opposing lens 28 and to focus it into optical fiber 31 carried by optical fiber ferrule stub 37. In this embodiment, lens 30 is the same size and type of lens as collimating lens 28, such as a ball lens. However, other beam focusing lenses may be used. As shown, lens 30 is held in a frame within sleeve 51 and is centered on axis x-x with fiber 31 and fiber stub 36.

An optical fiber assembly is coupled between lens 30 and O/E converter 32. The optical fiber termination assembly comprises optical fiber ferrule stub 37, optical fiber 31, and focusing lens 36. Focusing lens 36 is coupled between O/E converter 32 and fiber 31 and accurately focuses and directs the optical signal or light from optical fiber 31 carried by optical fiber ferrule stub 37 to optical receiver or diode 33 of O/E converter 32. As may be appreciated by those skilled in the art, lens 36 may comprise any form of focusing lens. Moreover, any device capable of directing the optical signal from optical fiber 31 carried by optical ferrule stub 37 to optical receiver 33 may be used.

O/E converter 32 comprises optical detector or receiver 33 and circuitry and amplifiers carried by circuit board 56 and coupled to optical detector 33. As will be appreciated by those skilled in the art, optical detector 33 may comprise a photo pin diode, a charge-couple device, or any other suitable photo sensitive device. As shown, OLE converter 32 has a shape compatible with TO-can optical packaging.

As shown, housing sleeve 51 has a cylindrical shape elongated along longitudinal axis x-x and circuit board 55 is illustratively mounted to extend along longitudinal axis x-x within sleeve 51. A first plurality of electrically conductive pins extend from OLE converter 32, which are further coupled to circuit board 55 adjacent the left end thereof. Thus, circuit board 55 is both mechanically and electrically coupled to OLE converter 32 by a first plurality of electrically conductive pins at its left end.

In this embodiment, electric lead 35 comprises a plurality of electrically conductive pins carried by and extending through end portion 53 of sleeve 51. Electrically conductive pins 35 are coupled internally to circuit board 55 adjacent the right end thereof. The electrically conductive pins extend through end portion 53 to define a plurality of external electrical connection pins 35. This allows connection element 19 to be easily connected to electrical circuitry. In this embodiment, six electrically conductive pins are provided, with three pins on top of circuit board 55 and three pins below circuit board 55. However, lead 35 may include as few as one or more than the six pins shown. Thus, circuit board 55 is both mechanically and electrically coupled to a second plurality of electrically conductive pins 35 at its right end.

Thus, an electrical interface or joint is provided having an optical transmitter and a receiver placed on the center axis of a rotating component. Lens 28 placed at the right end of ferrule stub 27 expands the optical beam to a diameter and angle of acceptance as great as practical. The optical faces of connection elements 18 and 19 are aligned so as to allow for on-axis optical transmission across gap 20. Electrical signals are input through pins 21 to E/O converter 22 and laser 23 for conversion to light, such light is in turn received by pin diode 33 and converted by OLE converter 32 back to electrical signals for output through leads 35. Because optical link 15 only needs to successfully pass the signals across rotating interface 20 to be acceptable, and does not necessarily need to minimize optical loss, issues that cause optical loss are rendered less important than with a typical FORJ. That is, the quality of the optical interface only needs to be good enough to not create a failure. If there is a very high loss, it is not relevant to performance of the system as both ends of connection 15 are electrical, not optical. Thus, the performance requirements of rotary connection 15 has been changed from minimizing optical loss to maximizing system tolerance to misalignment across rotary joint 20. Thus, connection 15 is not a conventional FORJ, is not a conventional slip ring, but is altogether new. Optical transmitters, receivers, or transceivers of different wavelengths and/or data rates may be packaged to create a variety of different solutions. In addition, multiple transmitters and/or receivers can be packaged with optical splitters and/or filters (i.e. optical wave division multiplexors) in system 15 to achieve additional channel/data throughput.

With connection 15, the electrons of an electrical signal are presented to the electrical leads at the end of the first connection element from a source. Those electrons travel through the electrical leads and into the electrical-to-optical converter, where the electrons are turned into laser light. That light then goes through a lens, and the lens helps the light get collimated into a fiber stub. So light goes from the laser, through the lens, into the fiber stub. The fiber stub is parallel to the center axis of the connection and a ball lens or other beam expanding lens is placed at the end of the fiber stub to expand the beam of light. The expanded light is then passed across the rotating interface, through the air gap, and is received by the corresponding lens of the second connection element. That lens brings the light back into a second fiber stub. At the other end of the fiber stub is a photodiode receiver which converts the photons back into electrons for output through the electrical leads at the other end of the second connection element. So the electrons input into one side of the rotary connection are exactly the same as the electrons output the other side of the rotary connection.

Accordingly, electrical-to-optical conversion of the signal is accomplished inside rotating connection 15. To the user the signals are presented as electrical signals on both ends of connection 15, but optical technology is utilized for on-axis signal transmission over rotating interface 20 inside connection 15. This allows for high data rate transmission over a rotating interface at a cost significantly lower than that of other methods or devices. It also results in a solution that is significantly smaller. This connection will accommodate higher data rates over time without any changes to the basic design.

Figure 3:
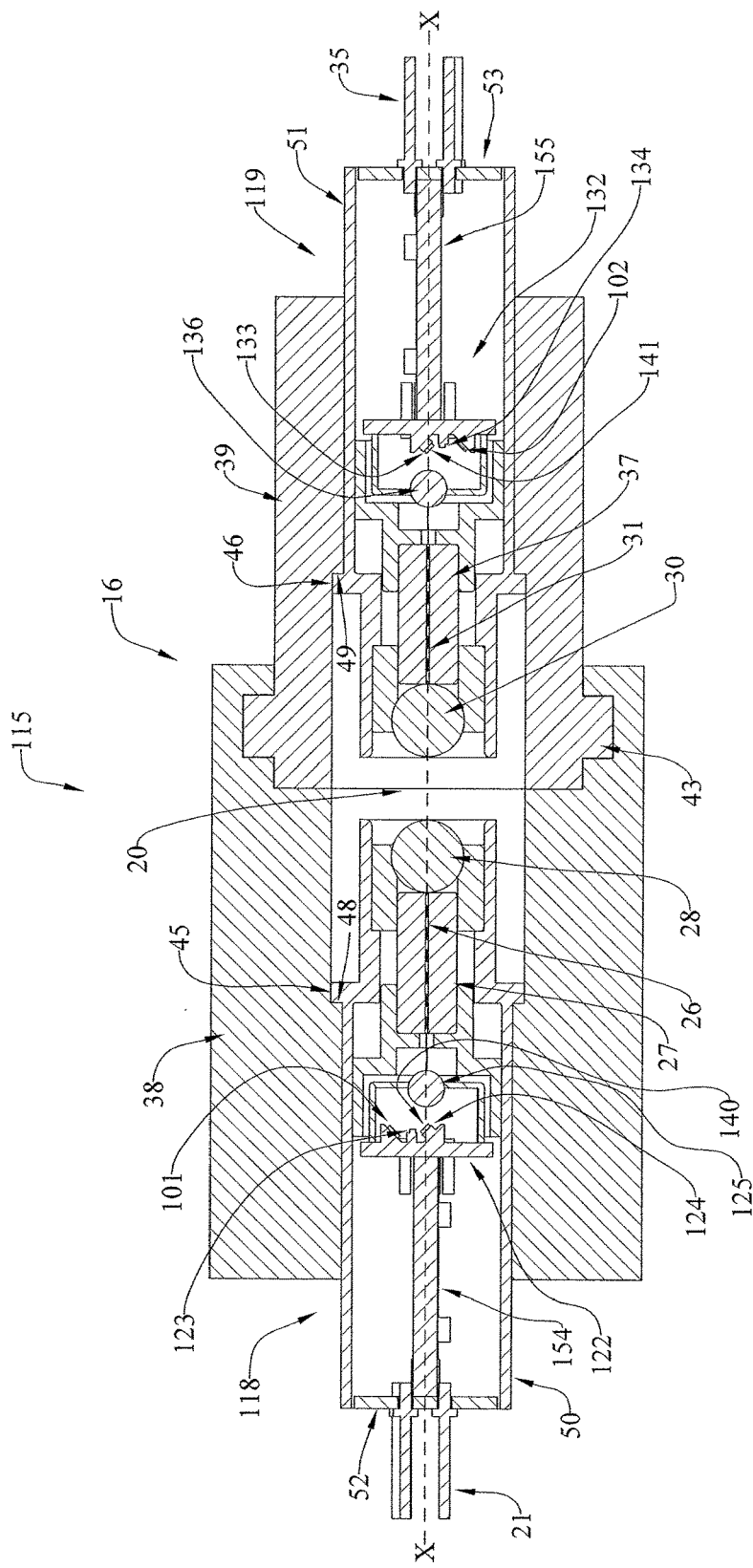
FIG. 3 is a longitudinal vertical sectional view of a second embodiment of an improved electrical rotary connection.

FIG. 3 shows a bi-directional second embodiment 115 of a connection. This embodiment is similar to the embodiment shown in FIGS. 1 and 2 with respect to the housing and rotational alignment of connection elements 18 and 19. However, in this embodiment E/O converter 22 and O/E converter 32 have been replaced with optical/electrical transceivers 122 and 132, respectively.

Transceiver 122 comprises optical source 123, optical discriminator 100, monitor diode 101, and circuitry carried by circuit board 154. In this embodiment, optical source 123 comprises a laser diode. As will be appreciated by those skilled in the art, optical source 123 may comprise a laser, a light emitting diode, or any other suitable optical source or transmitter. In this embodiment, optical discriminator 100 comprises PIN photodiode optical detector 124 having dichroic thin film coating 140. As will be appreciated by those skilled in the art, optical detector 124 may comprise a photo-diode, a charge-couple device, or any other suitable photo sensitive device. Thus, discriminator 100 is formed from a photodetector and an interference filter disposed on the photodetector. The end face of lens 125 faces towards optical discriminator 100 having filter 140. Discriminator 100 is also arranged relative to optical transmitter 123. Transmitter 123, discriminator 100, and lens 125 form the primary components of a bi-directional optical subassembly, sometimes referred to as a BOSA.

A light signal $\lambda_1$ is transmitted from optical transmitter 123 down onto the surface of filter 140, whereby radiation signal $\lambda_1$ is reflected by filter 140 toward lens 125. The radiation signal $\lambda_1$ is then transmitted through lens 125 and focused by lens 125 onto the spatial point nearly coincident with the end of fiber 26 for transmission through fiber 26 and lens 28 across rotary gap 20 to lens 30 and fiber 31 of connection element 119. The bi-directional light path comprises not only radiation signal $\lambda_1$ but also return radiation signal $\lambda_2$ from connection element 119. The radiation signal $\lambda_2$ is transmitted from optical fiber 26 toward lens 125. Lens 125 then focuses radiation signal $\lambda_2$ onto the absorbing region of discriminator 100 and diode 124.

FIG. 3 also shows monitor diode 101 which monitors laser diode 123. Monitor diode 101 comprises an absorbing region that receives radiation having the first wavelength $\lambda_1$ from laser diode 123. This radiation emerges from an end face of the strip-shaped waveguide of laser diode 123 that faces away from the transmitter exit pupil. As shown, transmitter 123, discriminator 100, and monitor diode 101 are supported by pedestals which are arranged at a distance from one another.

Transceiver 132 comprises optical source 134, optical discriminator 102, monitor diode 103, and circuitry carried by circuit board 155. In this embodiment, optical source 134 comprises a laser diode. As will be appreciated by those skilled in the art, optical source 134 may comprise a laser, a light emitting diode, or any other suitable optical source or transmitter. In this embodiment, optical discriminator 102 comprises PIN photodiode optical detector 133 having dichroic thin film coating 141. As will be appreciated by those skilled in the art, optical detector 133 may comprise a photo-diode, a charge-couple device, or any other suitable photo sensitive device. Thus, discriminator 102 is formed from a photodetector and an interference filter disposed on the photodetector. The end face of lens 136 faces towards optical discriminator 102 having filter 141. Discriminator 102 is also arranged relative to optical transmitter 134. Transmitter 134, discriminator 102, and lens 136 also form the primary components of a bi-directional optical subassembly.

A light signal $\lambda_2$ is transmitted from optical transmitter 134 down onto the surface of the filter 141, whereby radiation signal $\lambda_2$ is reflected by filter 140 toward lens 136. The radiation signal $\lambda_2$ is then transmitted through lens 136 and focused by lens 136 onto the spatial point nearly coincident with the end of fiber 31 for transmission through fiber 31 and lens 30 across rotary gap 20 to lens 28 and fiber 26 of connection element 118. The bi-directional light path comprises not only radiation signal $\lambda_2$ but also return radiation signal $\lambda_1$ from connection element 118. The radiation signal $\lambda_1$ is transmitted from optical fiber 31 toward lens 136. Lens 136 then focuses radiation signal $\lambda_1$ onto the absorbing region of discriminator 102 and diode 133.

FIG. 3 also shows monitor diode 103 which monitors laser diode 134. Monitor diode 103 comprises an absorbing region that receives radiation having the first wavelength $\lambda_2$ from laser diode 134. This radiation emerges from an end face of the strip-shaped waveguide of laser diode 134 that faces away from the transmitter exit pupil. As shown, transmitter 134, discriminator 102, and monitor diode 103 are supported by pedestals which are arranged at a distance from one another.

Thus, connection 115 allows for first connection element 118 to transmit one direction at a first wavelength and second element 119 to transmit the other direction at a second wavelength. The wavelengths can be mixed and matched as desired based on the lasers transmitting. So each laser can transmit at a specific wavelength and the filters can be tuned specifically for that wavelength. For example, and without limitation, connection element 118 could have a transmitter at 1310 nanometers and second connection element 119 could have a dichroic filter that reflects 1310 and second connection element 119 could transmit at 850 and first connection element could have a dichroic filter that reflects 850 . Accordingly, an electrical input received by electrical lead 21 of connection element 118 may be converted into light, the light may be transmitted on-axis across rotary interface 20 to connection element 119, and the light may be converted into an electrical output by connection element 119 for transmission via electrical lead 35 of connection element 119, and simultaneously an electrical input received by electrical lead 35 of connection element 119 may be converted into light, the light may be transmitted on-axis across rotary interface 20 to connection element 118, and the light may be converted into an electrical output by connection element 118 for transmission via electrical lead 21 of connection element 118.

Additional lasers, receivers and fiber may be added to provide for multiple bi-directional transmissions. Thus, connection element 118 may be configured and arranged to transmit multiple optical signals at multiple different wavelengths and connection element 119 may be configured to receive the multiple transmitted optical signals from connection element 118. Similarly, connection element 119 may comprise multiple optical sources configured to transmit multiple optical signals at multiple different wavelengths and connection element 118 may comprise multiple optical receivers configured to receive the optical signals at the different wavelengths from connection element 119.

Figure 4:
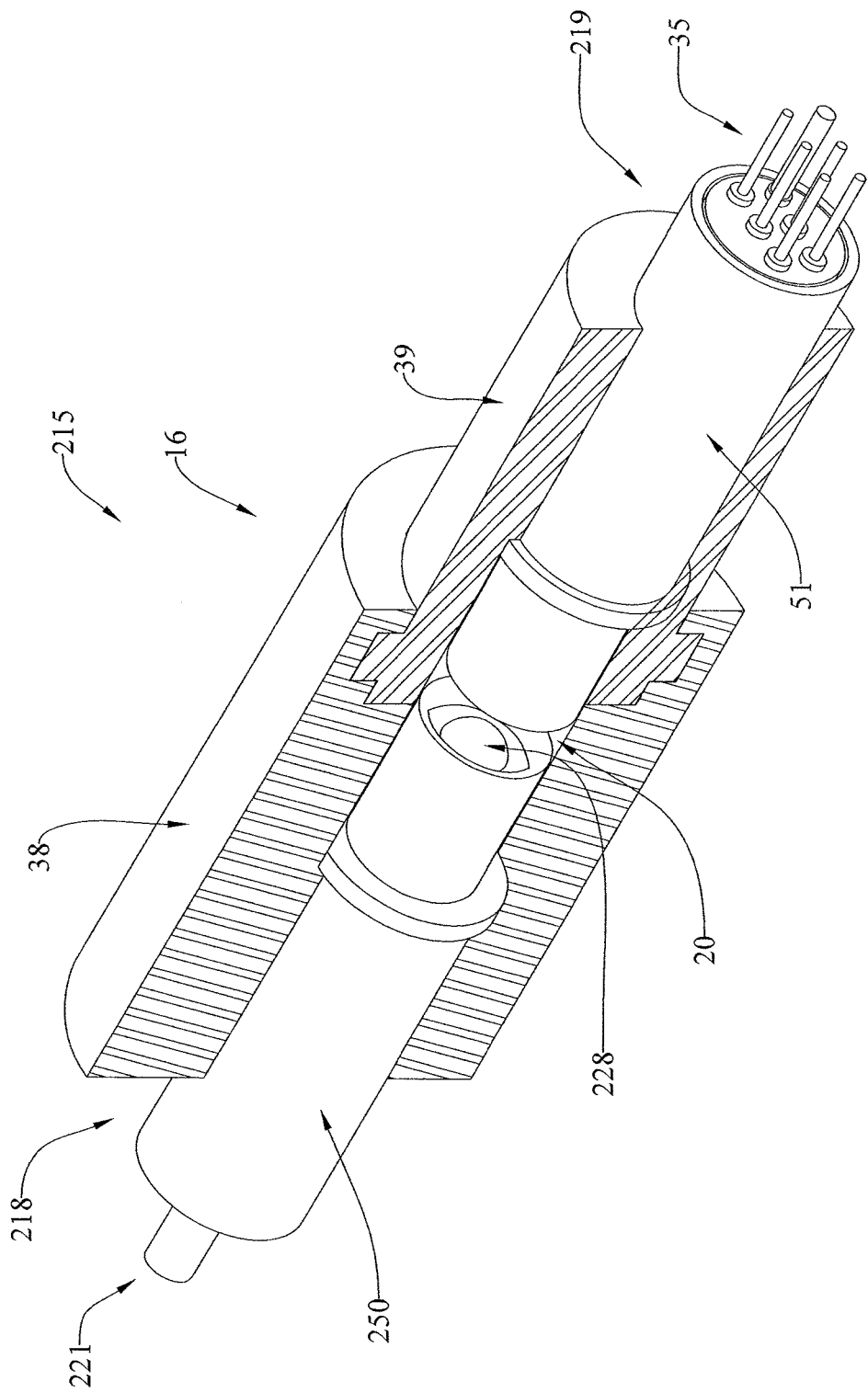
FIG. 4 is a partial cross-sectional and partial isometric view of a third embodiment of an improved electrical rotary connection.

FIG. 4 shows a third embodiment connection 215. This embodiment is similar to the embodiment shown in FIGS. 1 and 2 with respect to the housing and rotational alignment of connection elements 218 and 219. Similar to connection 15, left connection element 218 of connection 215 is generally held stationary and right connection element 219 is generally permitted to rotate about its longitudinal axis x-x relative to connection element 218. Also, connection element 219 is of the same configuration as connection element 19 in FIG. 2, generally having a collimating lens, an optical fiber ferrule stub, a focusing lens, an OLE converter, a printed circuit board, and electrical lead 35, all of which are retained in generally cylindrical sleeve 51. This allows connection element 219 to be easily connected to electrical circuitry.

However, unlike connection element 18 in FIG. 2, in this embodiment connection element 218 does not include an electrical lead, a printed circuit board, an E/O converter nor a focusing lens. Instead, connection element 218 only includes lens 228 in optical communication with optical fiber stub 221 and fiber therein. Optical fiber 221 extends within sleeve 250 from lens 228 through the left end portion of sleeve 250. This allows connection element 218 to be easily connected to a fiber optic system.

In this embodiment, one side 218 of rotating connection 215 only includes optical fiber 221 and the other side 319 includes a receiver and O/E converter. Thus, in this embodiment, rotating connection 215 allows for optical input via fiber 221 to connection element 218 on one side of rotating interface 20 and electrical output via lead 35 on the other side 219 of rotating interface 20. Optical signals are received on one side 218 of rotating interface 20 and are transmitted on-axis to the other side 219 of rotating interface 20, where they are converted into electrical signals for output as electrical signals. Thus, photons are received on one side of the rotating interface and electrons are transmitted from the other side of the rotating interface.

Figure 5:
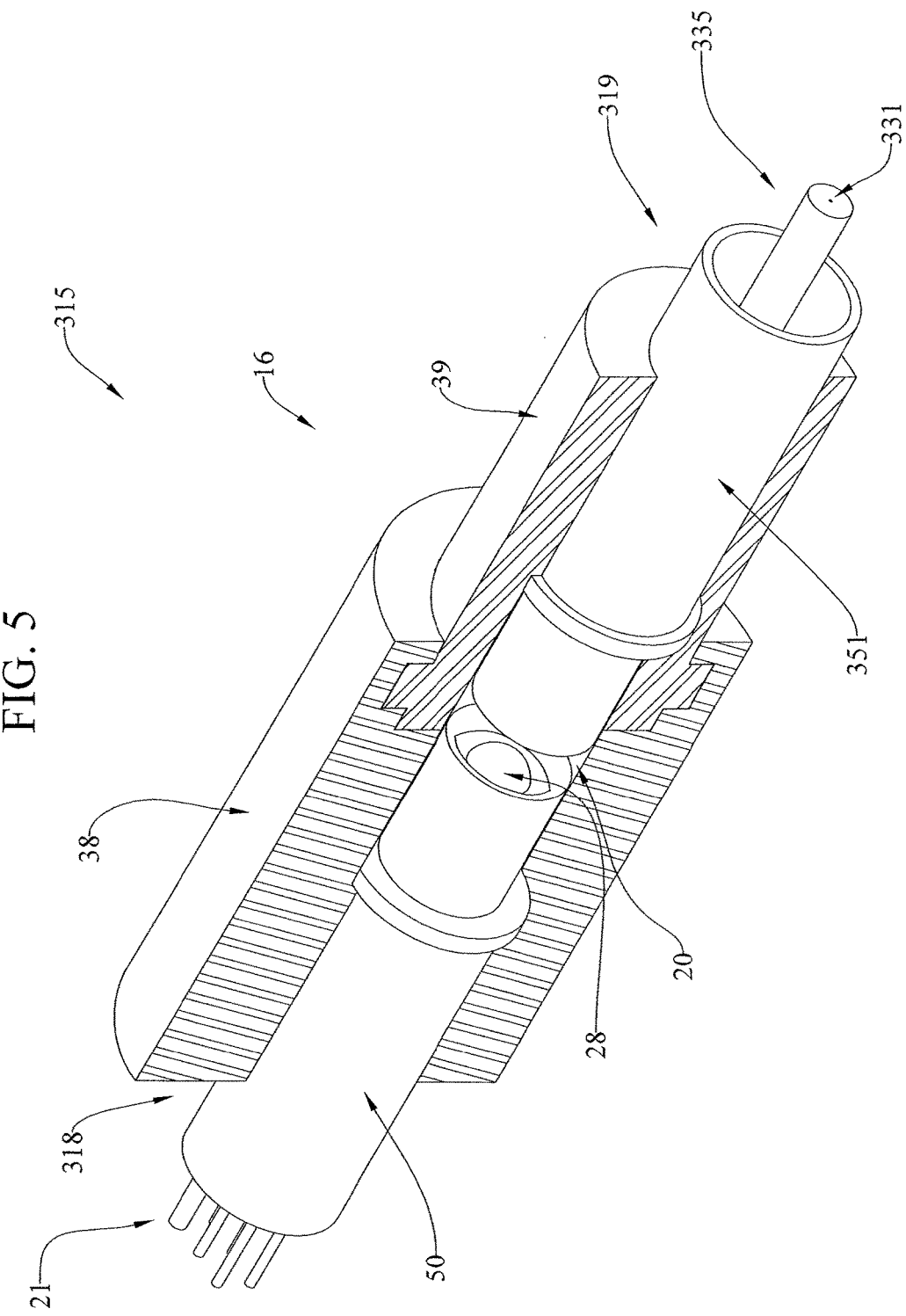
FIG. 5 is a partial cross-sectional and partial isometric view of a fourth embodiment of an improved electrical rotary connection.

FIG. 5 shows a fourth embodiment connection 315. This embodiment is also similar to the embodiment shown in FIGS. 1 and 2 with respect to the housing and rotational alignment of connection elements 318 and 319. Similar to connection 15, left connection element 318 of connection 315 is generally held stationary and right connection element 319 is generally permitted to rotate about its longitudinal axis x-x relative to connection element 318. Also, connection element 318 is of the same configuration as connection element 18 in FIG. 2, generally having an electrical lead, a printed circuit board, an E/O converter, a focusing lens, an optical fiber ferrule stub, and expanding collimating lens 28, all of which are retained in generally cylindrical sleeve 50. This allows connection element 18 to be easily connected to electrical circuitry.

However, unlike connection element 19 in FIG. 2, in this embodiment connection element 319 does not include a focusing lens, an O/E converter, a printed circuit board, nor an electrical lead. Instead, connection element 319 only includes a lens in optical communication with optical fiber stub 335 and fiber 331. Optical fiber 331 extends within sleeve 351 from the receiving lens at rotary junction 20 through the right end portion of sleeve 351. This allows connection element 319 to be easily connected to a fiber optic system.

In this embodiment, one side 318 of rotating connection 315 includes an E/O converter and transmitter but the other side only includes optical fiber 331. Thus, in this embodiment, rotating connection 315 allows for electrical input via leads 21 to connection element 318 on one side of rotating interface 20 and optical output via fiber 331 on the other side 319 of rotating interface 20. Electrical signals are received by leads 21 on one side of rotating interface 20, where they are converted into optical signals and transmitted on-axis to the other side of rotating interface 20 for output as optical signals via fiber 331. Thus, electrons are received on one side of the rotating interface and photons are transmitted from the other side of the rotating interface.

The present invention contemplates that many changes and modifications may be made. Therefore, while forms of the improved rotary connection have been shown and described, and a number of alternatives discussed, persons skilled in this art will readily appreciate that various additional changes and modifications may be made without departing from the scope of the invention, as defined and differentiated by the following claims.

What is claimed is:

1. A non-contacting rotary connection for transmission of signals across an interface comprising:
a housing;
a first element supported by said housing;
a second element supported by said housing;
said first element and said second element configured and arranged such that one of said first or second elements rotates about a central axis relative to the other of said first or second elements;
a rotary interface between said first element and said second element;
said first element comprising:
an input electrical lead;
an electrical-to-optical (E/O) converter coupled to said input electrical lead and having an optical source; and
a transmitting lens coupled to said optical source and configured to direct an optical signal across said rotary interface;
a transmitting optical fiber coupled between said optical source and said transmitting lens; and
a focusing lens coupled between said optical source and said transmitting optical fiber;
said second element comprising:
a receiving lens opposing said first element across said rotary interface and
configured to receive said optical signal from said transmitting lens;
an optical-to-electrical (O/E) converter coupled to said receiving lens and having an optical receiver; and
an output electrical lead coupled to said O/E converter;
whereby an electrical input received by said first element is converted into light, said light is transmitted across said rotary interface to said second element, and said light is converted into an electrical output by said second element for transmission via said output electrical lead of said second element.

2. The device set forth in claim 1, wherein said first element is stationary and said second element is rotationally supported by said housing and rotates relative to said first element.

3. The device set forth in claim 1, wherein said first element rotates about said central axis and said second element rotates about said central axis at a speed different from said first element.

4. The device set forth in claim 1, wherein said second element is stationary and said first element is rotationally supported by said housing and rotates relative to said second element.

5. The device set forth in claim 1, wherein said rotary interface comprises a gap between said transmitting lens and said receiving lens.

6. The device set forth in claim 1, wherein said transmitting lens comprises a beam expanding lens.

7. The device set forth in claim 1, wherein said second element further comprises receiving optical fiber coupled between said receiving lens and said optical receiver.

8. The device set forth in claim 7, wherein said transmitting lens comprises an expanding collimating lens and said receiving lens comprises a collimating lens.

9. The device set forth in claim 1, wherein said input electrical lead comprises multiple electrically conductive pins and said output electrical lead comprises multiple electrically conductive pins.

10. The device set forth in claim 1, whereon said optical source and said optical receiver are each orientated about said central axis.

11. The device set forth in claim 1, wherein said second element further comprises receiving optical fiber coupled between said receiving lens and said optical receiver, and said transmitting optical fiber and said receiving optical fiber are each orientated about said central axis.

12. The device set forth in claim 1, wherein:
said E/O converter comprises a transceiver having an optical receiver; and
said O/E converter comprises a transceiver having an optical source;
whereby an electrical input received by said output electrical lead of said second element may be converted into light, said light may be transmitted across said rotary interface to said first element, and said light may be converted into an electrical output by said first element for transmission via said input electrical lead of said first element.

13. The device set forth in claim 12, wherein said transmission from said first element across said rotary interface has a first wavelength and said transmission from said second element across said rotary interface has a second wavelength different from said first wavelength.

14. The device set forth in claim 13, wherein said first element and said second element each further comprise a dichroic filter.

15. The device set forth in claim 12, wherein said transmission from said first element to said second element and said transmission from said second element to said first element are simultaneous.

16. The device set forth in claim 1, wherein said first element is configured and arranged to transmit multiple optical signals at multiple different wavelengths and said second element is configured to receive said multiple transmitted optical signals from said first element.

17. The device set forth in claim 16, wherein said first element comprises multiple optical sources configured to transmit said optical signals at said different wavelengths and second element comprises multiple optical receivers configured to receive said optical signals at said different wavelengths, respectively.

18. A non-contacting rotary connection for transmission of signals across an interface comprising:
- a housing;
- a first element supported by said housing;
- a second element supported by said housing;
- said first element and said second element configured and arranged such that one of said first or second elements rotates about a central axis relative to the other of said first or second elements;
- a rotary interface between said first element and said second element;
- said first element comprising:
  - an input optical fiber; and
  - a transmitting lens coupled to said input optical fiber and configured to direct an optical signal across said rotary interface;
- said second element comprising:
  - a receiving lens opposing said first element across said rotary interface and configured to receive said optical signal from said transmitting lens;
  - an optical-to-electrical (O/E) converter coupled to said receiving lens and having an optical receiver;
  - receiving optical fiber coupled between said receiving lens and said optical receiver: and
  - an electrical lead coupled to said O/E converter;
- whereby an optical input received by said input optical fiber of said first element is transmitted across said rotary interface to said second element, and said light is converted into an electrical output by said second element for transmission via said electrical lead of said second element.

19. The device set forth in claim 18, wherein said second element further comprises receiving optical fiber coupled between said receiving lens and said optical receiver and said receiving lens comprises a collimating lens.

20. The device set forth in claim 18, wherein said electrical lead comprises multiple electrically conductive pins.

21. The device set forth in claim 18, wherein said O/E converter comprises a transceiver having an optical source, whereby an electrical input received by said electrical lead of said second element may be converted into light, said light may be transmitted across said rotary interface to said first element, and said light may be transmitted by said first element via said input optical fiber.

22. A non-contacting rotary connection for transmission of signals across an interface comprising:
- a housing;
- a first element supported by said housing;
- a second element supported by said housing;
- said first element and said second element configured and arranged such that one of said first or second elements rotates about a central axis relative to the other of said first or second elements;
- a rotary interface between said first element and said second element;
- said first element comprising:
  - an electrical lead;
  - an electrical-to-optical (E/O) converter coupled to said electrical lead and having an optical source; and
  - a transmitting lens coupled to said optical source and configured to direct an optical signal across said rotary interface;
  - a transmitting optical fiber coupled between said optical source and said transmitting lens; and
  - a focusing lens coupled between said optical source and said transmitting optical fiber;
- said second element comprising:
  - a receiving lens opposing said first element across said rotary interface and configured to receive said optical signal from said transmitting lens; and
  - a receiving optical fiber coupled to said receiving lens;
- whereby an electrical input received by said first element is converted into light, said light is transmitted across said rotary interface to said second element, and said light is transmitted by said second element via said receiving optical fiber.

23. The device set forth in claim 22, wherein said receiving lens comprises a collimating lens.

24. The device set forth in claim 22, wherein said electrical lead comprises multiple electrically conductive pins.

25. The device set forth in claim 22, wherein said E/O converter comprises a transceiver having an optical receiver, whereby an optical input received by said optical fiber and said receiving lens of said second element may be transmitted across said rotary interface to said first element, and said light may be converted into an electrical output by said first element for transmission via said electrical lead of said first element.

26. The device set forth in claim 25, wherein said first element and said second element each further comprise a dichroic filter.

* * * * *